US009659487B2

(12) United States Patent
Tan et al.

(10) Patent No.: US 9,659,487 B2
(45) Date of Patent: May 23, 2017

(54) REMOTE CONTROL CONFIGURATION USING A REMOTE CONTROL PROFILE

(71) Applicant: Apple Inc., Cupertino, CA (US)

(72) Inventors: Liquan Tan, Sunnyvale, CA (US); Daniel R. Fletcher, Campbell, CA (US); Wing Kong Low, Sunnyvale, CA (US); Jonah A. Harley, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/163,441

(22) Filed: May 24, 2016

(65) Prior Publication Data

US 2016/0267785 A1 Sep. 15, 2016

Related U.S. Application Data

(63) Continuation of application No. 14/079,286, filed on Nov. 13, 2013, now Pat. No. 9,368,024.

(60) Provisional application No. 61/883,799, filed on Sep. 27, 2013.

(51) Int. Cl.
*G05B 11/01* (2006.01)
*G08C 17/02* (2006.01)

(52) U.S. Cl.
CPC ......... *G08C 17/02* (2013.01); *G08C 2201/21* (2013.01); *G08C 2201/30* (2013.01)

(58) Field of Classification Search
CPC ...................................................... G08C 17/02
USPC ...................................................... 340/12.28
See application file for complete search history.

(56) References Cited

U.S. PATENT DOCUMENTS

| | | | |
|---|---|---|---|
| 6,130,625 | A | 10/2000 | Harvey |
| 7,606,872 | B2 | 10/2009 | Stevenson et al. |
| 7,671,758 | B1 | 3/2010 | Seidel et al. |
| 8,254,352 | B2 | 8/2012 | Negron et al. |
| 8,350,744 | B2 | 1/2013 | Belz et al. |
| 8,400,344 | B2 | 3/2013 | Reams |
| 8,643,477 | B2 | 2/2014 | Belz et al. |
| 8,918,544 | B2 | 12/2014 | Chardon et al. |
| 8,929,351 | B2 | 1/2015 | Negron et al. |

(Continued)

FOREIGN PATENT DOCUMENTS

| | | | |
|---|---|---|---|
| CN | 101959004 | A | 1/2011 |
| CN | 203397465 | U | 1/2014 |

*Primary Examiner* — Kerri McNally
(74) *Attorney, Agent, or Firm* — Meyertons Hood Kivlin Kowert & Goetzel, P.C.; Jeffrey C. Hood; Joel L. Stevens

(57) ABSTRACT

Utilizing remote control profile information for configuration of a remote control device. A media processing device may store a remote control profile, locally or on a server accessible via a wide area network, which may include information for configuring a remote control device to utilize one or more wireless remote control commands for controlling the media processing device. The media processing device may also detect one or more wireless remote control commands for controlling one or more other electronic devices and update the remote control profile to include information for configuring a remote control device to utilize those commands. It may be determined to configure a remote control device according to the remote control profile based at least in part on proximity of the remote control device to the media processing device. The remote control device may then be configured according to the remote control profile.

20 Claims, 3 Drawing Sheets

(56) References Cited

U.S. PATENT DOCUMENTS

| | | | |
|---|---|---|---|
| 9,021,538 | B2 | 4/2015 | Ellis et al. |
| 9,368,024 | B2 * | 6/2016 | Tan ........................ G08C 17/02 |
| 2002/0042912 | A1 | 4/2002 | Iijima et al. |
| 2004/0237115 | A1 | 11/2004 | Horiuchi et al. |
| 2006/0238369 | A1 | 10/2006 | Mamontov |
| 2007/0188323 | A1 | 8/2007 | Sinclair et al. |
| 2008/0005676 | A1 | 1/2008 | Evans et al. |
| 2008/0016081 | A1 | 1/2008 | MacMillan et al. |
| 2008/0016196 | A1 | 1/2008 | MacMillan et al. |
| 2008/0026671 | A1 | 1/2008 | Smith et al. |
| 2008/0057887 | A1 | 3/2008 | Tucker et al. |
| 2008/0062034 | A1 | 3/2008 | Harris et al. |
| 2008/0077942 | A1 | 3/2008 | MacMillan et al. |
| 2008/0141293 | A1 | 6/2008 | Blanchard et al. |
| 2008/0243998 | A1 | 10/2008 | Oh et al. |
| 2009/0019488 | A1 | 1/2009 | Ruiz-Velasco et al. |
| 2009/0181354 | A1 | 7/2009 | Dasgupta |
| 2009/0181356 | A1 | 7/2009 | Dasgupta |
| 2009/0265636 | A1 | 10/2009 | Ruiz-Velasco et al. |
| 2009/0279567 | A1 | 11/2009 | Ta et al. |
| 2009/0288118 | A1 | 11/2009 | Chang |
| 2010/0053458 | A1 | 3/2010 | Anglin et al. |
| 2010/0081375 | A1 * | 4/2010 | Rosenblatt ............ G08C 17/02 455/41.1 |
| 2010/0123834 | A1 | 5/2010 | Brodersen et al. |
| 2010/0153991 | A1 | 6/2010 | Pandey |
| 2011/0072369 | A1 | 3/2011 | Choi et al. |
| 2011/0121943 | A1 | 5/2011 | Morovitz et al. |
| 2011/0288912 | A1 | 11/2011 | McCrea et al. |
| 2012/0124632 | A1 | 5/2012 | Rothschild et al. |
| 2012/0229660 | A1 | 9/2012 | Matthews et al. |
| 2012/0242455 | A1 | 9/2012 | Hale et al. |
| 2012/0295662 | A1 | 11/2012 | Haubrich |
| 2013/0093962 | A1 | 4/2013 | Bruhn et al. |
| 2014/0122059 | A1 | 5/2014 | Patel et al. |
| 2014/0280879 | A1 | 9/2014 | Skolicki |
| 2014/0373046 | A1 | 12/2014 | Franji |

* cited by examiner

REMOTE CONTROL CONFIGURATION USING A REMOTE CONTROL PROFILE

PRIORITY CLAIM

The present application is a continuation of U.S. patent application Ser. No. 14/079,286, titled "Remote Control Configuration Using a Remote Control Profile", which was filed on Nov. 13, 2013, whose inventors are Liquan Tan, Daniel R Fletcher, Wing Kong Low, and Jonah A Harley, which claims benefit of priority to U.S. Provisional Application No. 61/883,799 titled "Remote Control Configuration using a Remote Control Profile" and filed on Sep. 27, 2013, whose inventors are Liquan Tan, Daniel R Fletcher, Wing Kong Low, and Jonah A Harley, both of which are hereby incorporated by reference in their entirety as though fully and completely set forth herein.

FIELD

The present disclosure relates to wireless devices, and more particularly to systems and methods for remote control configuration using remote control profiles.

DESCRIPTION OF THE RELATED ART

Remote control devices are commonly used to control target devices (such as set-top boxes, televisions, and stereo systems) via radio frequency (RF) or infrared (IR) wireless communication. Some remote control devices are pre-programmed to control a specific device, or a device of a specific type or model, while some other remote control devices are capable of dynamically learning commands for controlling devices. Despite the considerable effort in the art devoted to the development of "learning" remote control devices, further improvements in this area would be desirable.

SUMMARY

Embodiments are presented herein of, inter alia, methods for custom configuring remote control devices, in particular using remote control profiles.

Techniques are described, whereby a media processing device may store a remote control profile containing information for configuring a remote control device to control the media processing device. The media processing device may also detect and learn commands directed towards controlling other electronic devices, such as any other electronic devices in proximity to the media processing device. For example, the media processing device might be a set top box in the vicinity of a television system and an audio rendering system, each of which might have dedicated remote control devices associated with them. In this example, the set top box might detect commands directed to the television system from a remote control associated with the television system.

The media processing device may then modify the remote control profile to include information for configuring a remote control device to control those other electronic devices. Thus, continuing the above example, the set top box might modify the remote control profile such that a remote control configured according to the profile could control both the set-top box and the television system.

A remote control device may at some point be configured according to the remote control profile. For example, a remote control device may be brought into proximity with the media processing device, which may (individually or in combination with other indicators) trigger configuration of the remote control device according to the remote control profile. After configuration, the remote control device may be able to control both the media processing device, and any other electronic devices for the remote control profile provides configuration information.

Thus, a custom remote control profile may be generated, stored and maintained for use in association with multiple electronic devices. This may facilitate configuration of a new remote control device, particularly if techniques for triggering pairing and configuring of the new remote control device with an electronic device and its associated remote control profile, such as bumping and/or other proximity based triggers, are also provided.

The techniques described herein may be implemented in and/or used with a number of different types of devices, including but not limited to, remote control devices, set top box devices, audio rendering devices, television systems, appliances, cellular phones, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
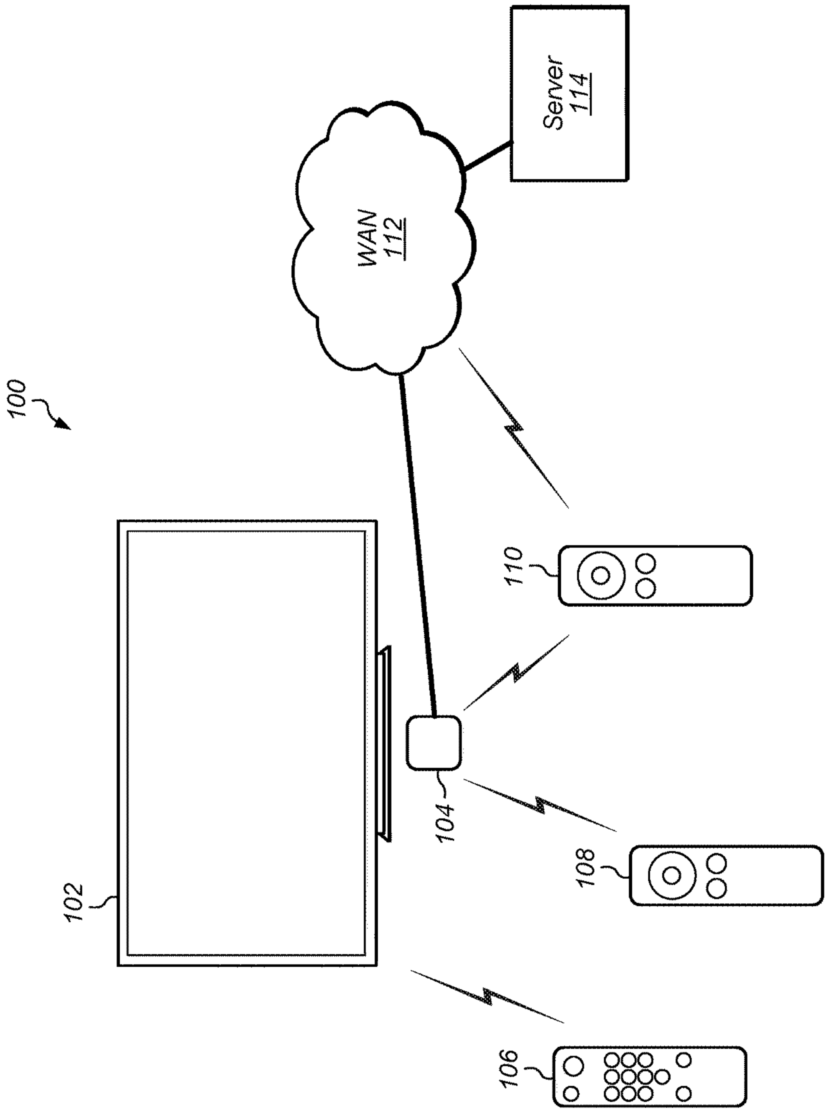
FIG. 1 illustrates an exemplary system including remote control devices and electronic devices under control.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Media Processing Device—Any of various electronic devices that are capable of processing and/or playing back media content, such as audio, image, and/or video content. Some examples of media processing devices include set top boxes, digital video players, DVR devices, etc. A media processing devices may store content or retrieve and/or facilitate retrieval of content from other sources. For example, a media processing device may be capable of streaming content from the Internet or utilizing a tuner, cable, telephone line, satellite dish and/or antenna (among other possibilities) to obtain a signal source. A media processing device may also be capable of providing that content to one or more media rendering devices (e.g., a television or other display device(s), speaker(s), etc.) via any of various communicative means, including but not limited to HDMI and/or DVI cable(s), wireless HDMI, Wi-Fi, WiGig, Bluetooth, etc. Note additionally that in some instances, a television system (e.g., a "smart TV") may include media processing capabilities and thus may be considered a media processing device.

FIG. 1—Communication System

FIG. 1 illustrates an exemplary wireless communication system 100. It is noted that the system 100 of FIG. 1 is merely one example of a possible system, and embodiments may be implemented in any of various systems, as desired.

As shown, the exemplary system 100 includes electronic devices 102, 104, and remote control devices 106, 108, 110. Each of the electronic devices 102, 104 may be remotely controlled by one or more of the remote control devices 106, 108, 110. The electronic devices 102, 104 may be any of a variety of types of devices; for example, electronic device 102 may be a television, while electronic device 104 may be a media processing device, as illustrated in FIG. 1. It will be noted that while the system of FIG. 1 is shown as including just two electronic devices, aspects of the present disclosure may be implemented in systems having any number of additional electronic devices. Furthermore, the electronic devices may include any of a variety of types of devices, including but not limited to various home entertainment devices, appliances, and other types of devices, such as stereo/surround sound receivers, DVD/Blu-ray players, sets of speakers, wireless subwoofer, soundbars, video game consoles, set-top boxes, CD players, televisions, ceiling fans, light fixtures, lamps, ovens, dishwashers, microwaves, computers, displays, etc.

The system 100 may include one or more remote control devices which are "dedicated" remote control devices specifically configured for use with a particular (e.g., brand/model) electronic device. Such remote control devices may be pre-configured with a specific set of commands and may not be re-configurable. For example, remote control device 106 may be configured to control the television 102.

The system 100 may also (or alternatively) include one or more remote control devices which are "learning" or "universal" remote control devices, which may be capable of learning or being configured to use commands for controlling multiple electronic devices (e.g., of different types, brands, models, etc.). Such remote control devices may also be pre-configured for use with one or more electronic devices, in some cases. For example, remote control device 108 may be initially configured to control the media processing device 104, but may be capable of learning or being configured to use commands for controlling the television 102 (and possibly any number of other electronic devices alternatively or in addition).

As another possibility, a "learning" or "universal" remote control device may not be pre-configured to control any particular electronic device, and may need to be configured before being used to control any electronic devices. For example, remote control 110 might be a remote control device which is initially not configured to control any particular electronic device.

Note that the remote control devices 106, 108, 110 may be configured and/or configurable to use any of a variety of communicative means to remotely issue commands to devices under control. For example, any of infrared (IR), Bluetooth (BT) (including BT classic and/or BT low energy (BLE)), Wi-Fi, near-field communication (NFC), and/or any of a variety of other communicative means may be used by one or more of remote control devices 106, 108, 110 to issue commands.

Note also that while some remote control devices (whether "dedicated" or "universal") may be intended for use exclusively as remote control devices, other remote control devices may have multiple functions, of which remote control capability may be one. For example, in some cases, a smart phone or portable media player may be capable of acting as a remote control device, in addition to various other capabilities.

One (or more) of the electronic devices 102, 104 under control may be equipped (via Ethernet, USB, Wi-Fi, a cellular link, and/or any of various other wired or wireless communicative means, individually or in combination) to communicate with an external network. For example, as shown, media processing device 104 may be configured to communicate with wide area network (WAN) 112. The WAN may be any of a variety of WANs, such as the Internet, an intranet, a cellular service provider's core network, or any other WAN, among various possibilities. As another possibility, the television 102 may be a "smart TV" capable of providing some or all of the functionality of a media processing device. Thus in such a case, the television 102 may be configured to communicate with WAN 112 and/or one or more other signal sources.

In some cases, one or more of the remote control devices 106, 108, 110 may also be equipped to communicate with an external network. For example, as shown, remote control device 110 may also be configured to communicate with WAN 112. Similar to the media processing device 104, the remote control device may also communicate with the WAN via any of Ethernet, USB, Wi-Fi, cellular link, and/or any of various other wired or wireless means, individually or in combination; however, it may be preferable in at least some cases to utilize a wireless link (such as Wi-Fi or cellular) at the remote control device 110 in order to preserve the mobility of the remote control device.

The WAN may provide communicative access to certain cloud based services. For example, various servers (such as server 114 illustrated in FIG. 1) associated with various cloud services may be communicatively coupled to WAN 112. Such servers and cloud based services provided thereby may accordingly also be available to any remote control devices (such as remote control device 110) or electronic devices (such as media processing device 104) equipped to communicate with WAN 112.

Figure 4:
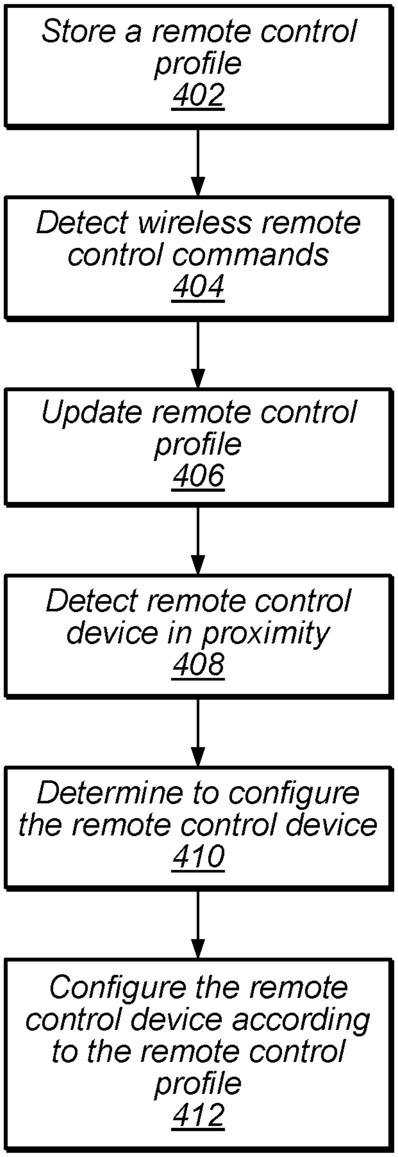
FIGS. 4-5 are flowchart diagrams illustrating aspects of techniques for custom configuring a remote control device using a remote control profile.
Figure 5:
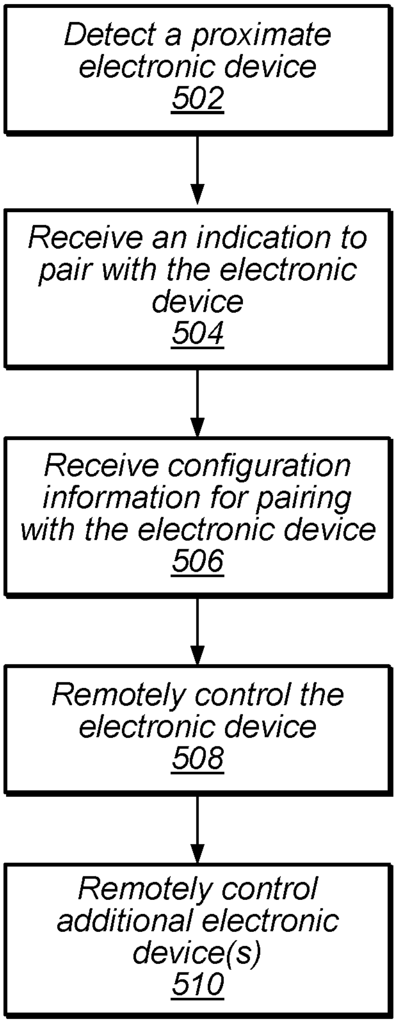

The system 100 of FIG. 1 may be one of many possible systems in which techniques for custom configuring remote control devices using remote control profiles, such as described further herein, inter alia, with respect to FIGS. 4-5, may be implemented.

Figure 2:
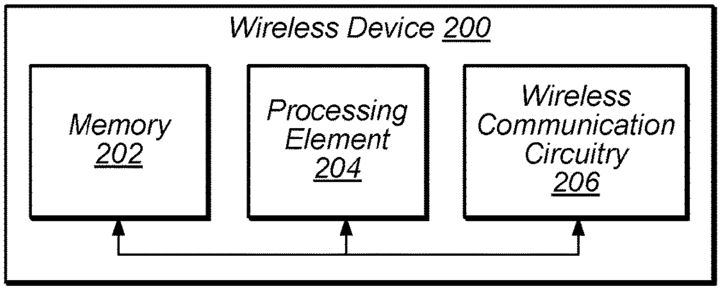
FIGS. 2-3 illustrate an exemplary block diagrams of wireless devices.

FIG. 2—Exemplary Block Diagram of a Wireless Device

FIG. 2 illustrates an exemplary block diagram of a wireless device 200 which may be configured for use in conjunction with various aspects of the present disclosure. For example, the wireless device 200 illustrated in FIG. 2 may be representative of one or more of the electronic devices 102, 104 or remote control devices 106, 108, 110 illustrated in FIG. 1, among various possibilities.

The device 200 may be any of a variety of types of device and may be configured to perform any of a variety of types of functionality. For example, the device 200 may be a substantially portable device (a mobile device), such as a remote control device, a mobile phone, a personal productivity device, a computer or a tablet, a handheld gaming console, a portable media player, etc. Alternatively, the device 200 may be a substantially stationary device, such as a stereo/surround sound receiver, DVD/Blu-ray player, set of speakers, wireless subwoofer, soundbar, video game console, set-top box, CD player, television, ceiling fan, light fixture, lamp, oven, dishwasher, microwave, computer, display, etc., if desired.

As shown, the device 200 may include a processing element 204. The processing element 204 may include or be coupled to one or more local and/or system memory elements, such as memory 202. Memory 202 may include any of a variety of types of memory and may serve any of a variety of functions. For example, memory 202 could be RAM serving as a system memory for processing element 204. Other types and functions are also possible.

The device 200 may also include wireless communication circuitry 206. The wireless communication circuitry 206 may include analog and/or digital circuitry components, including an antenna configured for wireless communication, among various possible components. If desired, the wireless communication circuitry 206 may include a discrete processing element in addition to processing element 204; for example, processing element 204 may be an 'application processor' while wireless communication circuitry 206 may include its own 'baseband processor'; alternatively (or in addition), processing element 204 may providing processing capability for the wireless communication circuitry 206. The device 200 may be capable of communicating using any of various wireless communication technologies by way of wireless communication circuitry 206.

The device 200 may additionally include any of a variety of other components (not shown) for implementing device functionality, depending on the intended functionality of the device 200, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 200, such as processing element 204, memory 202, and wireless communication circuitry 206, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 204 and wireless communication circuitry 206. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 204, memory 202, wireless communication circuitry 206, and/or any of various other device components. Other types of interfaces (e.g., peripheral interfaces for communication with peripheral components within or external to device 200, etc.) may also be provided as part of device 200.

As described herein, the device 200 may include hardware and software components for supporting custom configuration of a remote control device using a remote control profile, such as described herein with reference to, inter alia, FIG. 4 and/or FIG. 5.

Figure 3:
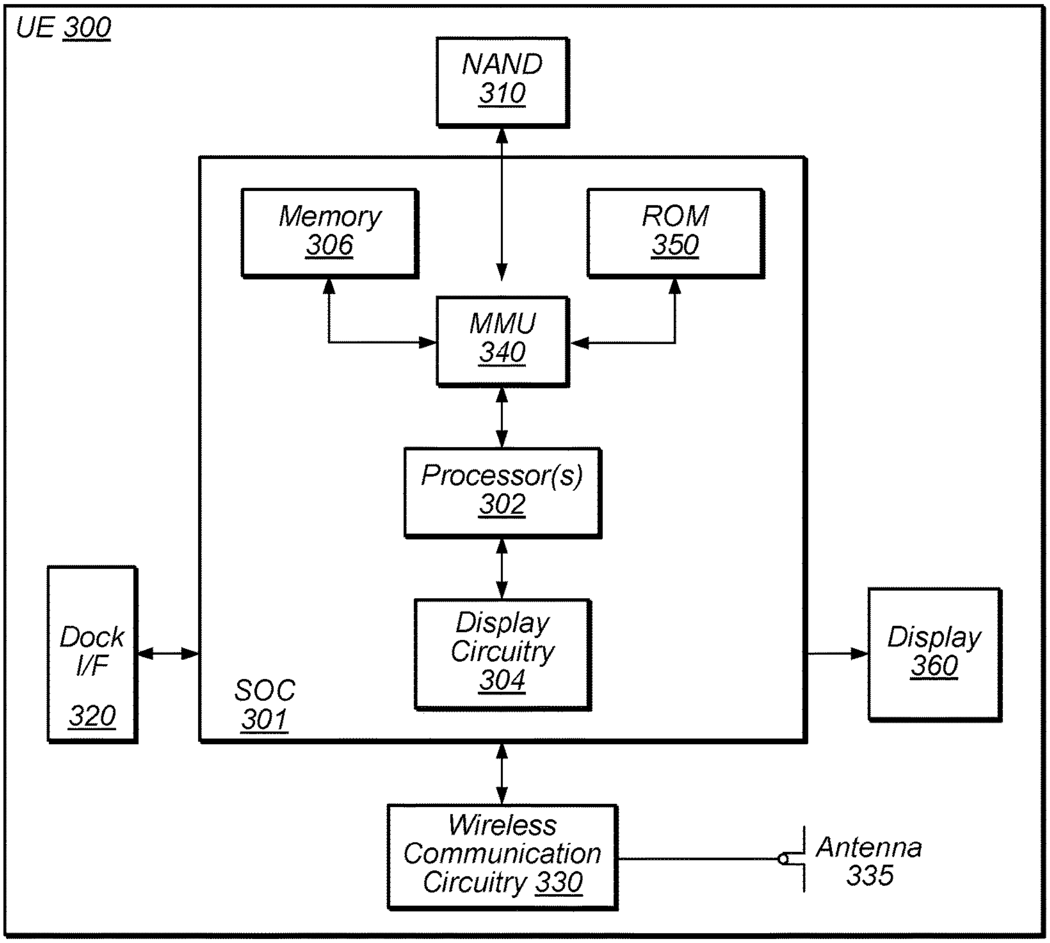

FIG. 3—Exemplary Block Diagram of a UE

FIG. 3 is an exemplary block diagram of a device 300, which may be one possible more detailed implementation of the device 200 illustrated in FIG. 2. As one example, the wireless device 300 illustrated in FIG. 3 may be representative of a substantially mobile wireless "user equipment" (UE) device, and thus wireless device 300 may also be referred to as UE 300 or UE device 300.

As shown, the UE 300 may include a system on chip (SOC) 301, which may include portions for various purposes. For example, as shown, the SOC 301 may include processor(s) 302 which may execute program instructions for the UE 300 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 301 may be coupled to various other circuits of the UE 300. For example, the UE 300 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As noted above, the UE 300 may be configured to communicate wirelessly using multiple wireless communication standards. As further noted above, in such instances, the wireless communication circuitry 330 may include components which are shared between multiple wireless communication standards and/or components which are configured exclusively for use according to a single wireless communication standard. As shown, the UE device 300 may include at least one antenna (and possibly multiple antennas, e.g., for MIMO and/or for implementing different wireless communication technologies, among various possibilities), for performing wireless communication with base stations, access points, and/or other devices. For example, the UE device 300 may use antenna 335 to perform the wireless communication.

The UE 300 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 300 may include hardware and software components for implementing features for supporting custom configuration of a remote control device using a remote control profile, such as those described herein with reference to, inter alia, FIG. 4 and/or FIG. 5. The processor 302 of the UE device 300 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 300, in conjunction with one or more of the other components 301, 304, 306, 310, 320, 330, 335, 340, 350, 360 may be configured to implement part or all of the features described herein, such as the features described herein with reference to, inter alia, FIG. 4 and/or FIG. 5.

FIGS. 4-5—Flowcharts

Embodiments of the present disclosure provide techniques for configuring a remote control device, including methods for a media processing device to store and maintain a remote control profile and to configure a remote control according to such a remote control profile. Certain embodiments are also directed to media processing devices and remote control devices configured to implement those methods. FIGS. 4-5 are flowchart diagrams illustrating such methods. The methods shown in FIGS. 4-5 may be used in conjunction with any of the computer systems or devices shown in the above Figures, among other devices. In particular, FIG. 4 illustrates a method which may be used by a media processing device to store and maintain a customizable remote control profile for use in conjunction with that media processing device and to configure a remote control device according to that remote control profile, while FIG. 5 illustrates a method which may be used by a remote control device to be configured according to a customized remote control profile. Some of the method elements shown may be performed concurrently, in a different order than shown, or may be omitted. Additional method elements may also be performed as desired. As shown, the method may operate as follows.

In 402, a media processing device may store a remote control profile. The remote control profile may include information for configuring a remote control device to utilize wireless remote control commands for controlling the media processing device.

The remote control profile may be stored locally on the media processing device. For example, the remote control profile may be stored in a memory element located in the media processing device. As another possibility, the remote control profile may be stored remotely from the media processing device. For example, the remote control profile may be stored on a networked storage device, such as a network drive. As another example, the remote control profile may be stored on a server accessible via a wide area network. The remote control profile might be stored on the server as part of a cloud-based service. For example, a cloud based service might provide a user account associated with the media processing device, which may specifically be used to store a remote control profile which may be used to configure a remote control device to control the media processing device. Note also that the remote control profile may be stored in multiple locations (e.g., both locally and remotely) if desired.

In 404, one or more wireless remote control commands for controlling one or more (e.g., at least a “second”, possibly a “third”, “fourth”, etc.) additional electronic devices may be detected by the media processing device. The wireless remote control commands for controlling the one or more additional electronic devices may be any of a variety of types of wireless remote control commands, possibly including commands communicated via multiple forms of wireless communication. For example, the detected wireless remote control commands might include infrared (IR) commands, Bluetooth (including Bluetooth Classic and/or Bluetooth Low Energy) commands, and/or Wi-Fi commands, among various possibilities.

The one or more additional electronic devices may include any of a variety of devices. As one example, considering the system 100 illustrated in FIG. 1, it might be the case that media processing device 104 might detect wireless remote control commands issued from the remote control device 106 for controlling the television 102. The one or more additional electronic devices might also or alternatively include one or more stereo/surround sound receivers, DVD/Blu-ray players, sets of speakers, wireless subwoofers, soundbars, video game consoles, set-top boxes, CD players, ceiling fans, light fixtures, lamps, ovens, dishwashers, microwaves, computers, additional televisions and/or displays, etc.

Note that the media processing device may be explicitly or implicitly configured to detect the wireless remote control commands for controlling the one or more additional electronic devices. The media processing device may, for example, be explicitly configured by user input (e.g., to enter a ‘learning mode’) to monitor one or more wireless media for wireless remote control commands, and as a result of such explicitly configured monitoring, may detect the wireless remote control commands for controlling the one or more additional electronic devices. Alternatively, the media processing device may be capable of ‘snooping’ or automatically detecting wireless remote control commands issued in its vicinity even without being explicitly configured to do so, and may thus be implicitly configured to detect any wireless remote control commands issued in its vicinity.

In 406, the media processing device may update the remote control profile (e.g., locally, or remotely, or both) based on detecting the wireless remote control commands for controlling one or more additional devices. In particular, updating the remote control profile may include adding information for configuring a remote control device to utilize the wireless remote control commands for controlling the one or more additional electronic devices to the remote control profile information.

Note that if the remote control profile is updated remotely (e.g., at a server, accessible via a WAN, on which the remote control profile is stored), updating the profile may include transmitting one or more messages to the remote storage location (e.g., to the server). For example, in some instances, a media processing device might update the remote control profile by transmitting one or more messages to a server on which the remote control profile is stored. The message(s) may include a representation of the detected wireless remote control commands and may cause the server to update the remote control profile, or may include a representation of an updated remote control profile which the server may use to replace a previous remote control profile, and/or may include various other content.

In some cases, the media processing device may already be paired with a remote control device, which may already be configured to utilize wireless remote control commands for controlling the media processing device, when the wireless remote control commands for controlling one or more additional electronic devices. In such a case, the media processing device may also teach (e.g., configure) the paired remote control device to utilize the wireless remote control commands for controlling one or more additional electronic devices based on detecting the wireless remote control commands for controlling the one or more additional electronic devices. Note that this (re-) configuration may be performed before, at the same time as, or after updating the remote control profile. As one example, a paired remote control device may be automatically updated (reconfigured) based on the remote control profile after the remote control profile has been updated (e.g., the paired remote control device may be synchronized with the remote control profile associated with its paired media processing device).

In 408, a remote control device may be detected in proximity to the media processing device. If no remote control device is yet paired with the media processing device, or if a user simply wishes to pair an additional (e.g., new) remote control device with the media processing device (for example, if an original remote control device is lost or broken), such a remote control device may be paired with the media processing device based at least in part on proximity of the remote control device to the media processing device. The proximity of the remote control device may be detected, as one example, based on wireless signal strength (e.g., received signal strength indicators or RSSIs) of the remote control device.

In 410, it may be determined to configure the remote control device according to the remote control profile. Determining to configure the remote control device according to the remote control profile may be based at least in part on the proximity of the remote control device to the media processing device. It may be determined, for example, to pair the remote control device proximate to the media processing device with the media processing device, and pairing the remote control device with the media processing device may include configuring the remote control device according to the remote control profile.

The determination to pair the remote control device with the media processing device and/or to configure the remote control device according to the remote control profile may be based on any of a variety of considerations. For example, any number of possible user indications may be defined and subsequently performed by a user to indicate a desire to pair a remote control device with the media processing device.

One possible indication might include physically bumping the remote control device against the media processing device. This may be detected by one or both devices based on wireless signal strength. For example, upon bumping the devices together, wireless signal strength of each device as detected by the other device may exceed a certain (e.g., predetermined) threshold, which may be detected by one or both devices, and used as an indication to pair the devices.

Another possible indication might include another form of user input indicating to pair proximate remote control and media processing devices in combination with one or both devices detecting proximity of the other device. For example, a 'pair' button (e.g., a dedicated button, a button accessible via a touchscreen display, or any other type of button) on either or both of the remote control or the media processing device might be pushed by a user while the two devices are in close proximity (e.g., as detected based on wireless signal strength). As another example, a sound cue such as saying the word "pair" (or any other pre-configured or configurable vocal or other sound cue) might be executed by a user and detected by one or both of the devices while the two devices are in close proximity.

The degree of proximity required for such user indications to trigger device pairing may be configured as desired. As one example, the degree of proximity required may be based on the media processing device detecting sufficient signal strength from the remote control device as to be able to receive and interpret remote control commands from the remote control device. As another example, it may be required that the remote control device have the strongest wireless signal strength of any wireless devices detected by the media processing device. As a still further example, it may be required that the remote control device be physically bumped against the media processing device in addition to receiving one or more of the above described (or any of various other possible) user indications. Other degrees of proximity are also possible.

Note further that the indication may be received as a wireless communication indicating to pair the remote control device with the media processing device, which may be received from the remote control device. Such may be the case, for example, if the remote control device makes a determination to pair itself with the media processing device (e.g., based on proximity and/or user input based indications such as previously described) and then communicates the determination to the media processing device.

In 412, the remote control device may be configured to utilize the wireless remote control commands for controlling the media processing device and to utilize the wireless remote control commands for controlling one or more additional electronic devices based on the remote control profile.

Note that the remote control device may be configured according to the remote control profile by the media processing device (e.g., if the remote control profile is stored on the media processing device or otherwise accessible only or preferably by the media processing device), or may configure itself by accessing the remote control profile from a remote storage location (e.g., bypassing the media processing device). For example, the remote control device may be capable of accessing (e.g., sending/receiving messages via a Wi-Fi or cellular link with) a cloud based service on which the remote control profile associated with the media processing device is located, and downloading/configuring itself according to the remote control profile.

As noted above, FIG. 5 relates to a method for a remote control device to be configured according to a customized remote control profile. The methods of FIGS. 4 and 5 may be used separately or in conjunction with one another.

In 502, a media processing device may be detected in proximity to the remote control device. Similarly as described with respect to step 408 of the method of FIG. 4, the proximity of the media processing device may be detected, as one example, based on wireless signal strength (e.g., received signal strength indicators or RSSIs) of the media processing device.

In 504, the remote control device may receive an indication to pair with the media processing device. The indication may be based at least in part on the proximity of the media processing device to the remote control device.

Similarly as described with respect to step 410 of the method of FIG. 4, the indication to pair the remote control device with the media processing device may be based on any of a variety of considerations. For example, any number of possible user indications may be defined and subsequently performed by a user to indicate a desire to pair a remote control device with the media processing device.

As previously described, such indications might be based on physically bumping the remote control device against the media processing device, receiving user input such as touching or holding down a 'pair' button on either or both of the remote control or the media processing device, detecting a sound cue, and/or any of a variety of other indications, in combination with a required degree of proximity between the remote control device and the media processing device. As also previously described, the degree of proximity required for such user indications to trigger device pairing may be configured as desired.

Note further that the indication may be received as a wireless communication indicating to pair the remote control device with the media processing device, which may be received from the media processing device. Such may be the case, for example, if the media processing device makes a determination to pair the remote control device with the media processing device (e.g., based on proximity and/or user input based indications such as previously described) and then communicates the determination to the remote control device.

In 506, configuration information for pairing with the media processing device may be received. The configuration information may be received in response to the indication to pair the remote control device with the media processing device. The configuration information may be received via one or more messages wirelessly from the media processing device (where the configuration information may have been stored, or which may have obtained the configuration information from a remote storage location such as a server accessible via a WAN), or may be obtained by the remote control device (bypassing the media processing device) from an alternate storage location (such as a server accessible via a WAN). For example, the remote control device might access the appropriate remote control profile stored by a cloud-based service by providing one or more messages including information identifying the media processing device (which may have been received by the remote control device from the media processing device) to the service, which may then provide one or more messages including the remote control profile (or a representation thereof) from one of its servers to the remote control device.

As a further possibility, the remote control profile may be stored by a cloud-based service in a manner such that it is uniquely associated with a user account (e.g., in addition to or instead of with the media processing device). In such a case, it may be possible for the remote control device to access and retrieve the remote control profile using credentials for the user account (e.g., username and password). Such a scenario may not actually require the wireless remote control device to be proximate to the media processing device to pair the remote control device with the media processing device/configure the remote control device according to the remote control profile.

The configuration information may be a remote control profile associated with the media processing device, such as previously described with respect to FIG. 4, and may include information for configuring the remote control device to utilize wireless remote control commands for controlling the media processing device and to utilize wireless remote control commands for controlling one or more additional electronic devices.

Accordingly, using the configuration information, the remote control device may configure itself to utilize the wireless remote control commands for controlling the media processing device and to utilize the wireless remote control commands for controlling the one or more additional electronic devices. Once the remote control device is configured to utilize the wireless remote control commands for controlling the media processing device, in 508, the remote control device may remotely control the media processing device by utilizing the wireless remote control commands for controlling the media processing device. Additionally, once the remote control device is configured to utilize the wireless remote control commands for controlling the one or more additional electronic devices, in 510, the remote control device may remotely control one or more additional electronic devices by utilizing the wireless remote control commands for controlling the one or more additional electronic devices.

Thus, according to the methods of FIGS. 4-5, a media processing device may store and maintain a customizable remote control profile. In particular, by providing the capability to detect wireless remote control commands associated with other electronic devices and add them to a remote control profile which already includes commands for controlling the media processing device itself, a remote control profile which is uniquely customized for the media processing device in its particular setting (i.e., including some or all nearby controllable electronic devices) may be maintained.

Furthermore, such a remote control profile may be used to update an existing paired remote control to expand its functionality (e.g., to learn additional commands for controlling additional electronic devices), potentially (in some instances) with minimal or no explicit user participation.

Additionally, such a remote control profile may be used to configure an additional (e.g., new) remote control device to exert the uniquely customized commands included in the remote control profile to control both the media processing device and any other electronic devices for which control information is stored in the remote control profile, as part of setting up a remote control capable of providing control over multiple electronic devices.

Note that in some instances a media processing device capable of implementing any or all aspects of the methods of FIGS. 4-5 may be a device such as a set top box; in such an instance, the set top box (or similar device) may be discrete from but coupled to a media presentation device (e.g., a display device such as a television) on which content is displayed/rendered. Alternatively or additionally, in some instances a media processing device capable of implementing any or all aspects of the methods of FIGS. 4-5 may be a "smart TV" or similar device—i.e., the media processing device may itself include a display, along with wireless communication circuitry, processing circuitry, and other components. Other device forms and functionality are also possible for a media processing device capable of implementing any or all aspects of the methods of FIGS. 4-5.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for a media processing device to configure a remote control device, the method comprising:

at the media processing device:

detecting a remote control device in proximity to the media processing device;

in response to detecting the remote control device in proximity to the media processing device, pairing the remote control device with the media processing device;

determining that the media processing device has been paired with the remote control device; and transmitting, in response to the pairing, a remote control profile to the remote control device, wherein the remote control profile comprises one or more commands configured to enable the remote control device to control the media processing device, and wherein the remote control profile is stored by a server accessible via a wide area network (WAN).

2. The method of claim 1, wherein the remote control device comprises a user equipment device.

3. The method of claim 1, wherein the remote control profile, further comprises one or more additional commands configured to enable the remote control device to control one or more additional electronic devices.

4. The method of claim 1, wherein after transmitting the remote control profile to the remote control device, the remote control device is configured to control the media processing device as well as one or more additional electronic devices without further configuration by the media processing device.

5. The method of claim 1, further comprising, at the media processing device:

detecting one or more additional electronic devices;

updating the remote control profile for the remote control device to control the one or more additional electronic devices; and transmitting the updated remote control profile to the remote control device to configure the remote control device to control the media processing device and the one or more additional electronic devices.

6. The method of claim 1, wherein the remote control profile is also stored locally on the media processing device.

7. The method of claim 1, wherein detecting the remote control device in proximity to the media processing device comprises receiving a user indication to initiate pairing of the media processing device with the remote control device.

8. The method of claim 1, wherein detecting the remote control device in proximity to the media processing device comprises determining a signal strength indicator of the remote control device exceeding a predetermined threshold.

9. A media processing device, comprising:

wireless communication circuitry, comprising one or more antennas configured for wireless communication;

a processing element operably coupled to the wireless communication circuitry;

wherein the wireless communication circuitry and the processing element are configured to:

detect a remote control device in proximity to the media processing device;

in response to detecting the remote control device in proximity to the media processing device, pair the remote control device with the media processing device;

determine that the media processing device has been paired with the remote control device; and transmit, in response to the pairing, a remote control profile to the remote control device, wherein the remote control profile comprises one or more commands configured to enable the remote control device to control the media processing device, and wherein the remote control profile further comprises one or more additional commands configured to enable the remote control device to control one or more additional electronic devices.

10. The media processing device of claim 9, wherein the remote control device comprises a user equipment device.

11. The media processing device of claim 9, wherein the processing element is further configured to:

detect the one or more additional electronic devices; and update the remote control profile for the remote control device to control the one or more additional electronic devices;

wherein said transmitting the remote control profile comprises transmitting the updated remote control profile, wherein the updated remote control profile enables the remote control device to control the media processing device and the one or more additional electronic', devices.

12. The media processing device of claim 9, wherein the remote control profile is stored locally on the media processing device.

13. The media processing device of claim 9, wherein detecting the remote control device in proximity to the media processing device comprises determining a signal strength indicator of the remote control device exceeding a predetermined threshold.

14. A remote control device, comprising:

wireless communication circuitry, comprising one or more antennas configured for wireless communication;

a processing element operably coupled to the wireless communication circuitry;

wherein the wireless communication circuitry and the processing element are configured to:

receive an indication to pair the remote control device with a media processing device, wherein the indication is based at least in part on proximity of the remote control device to the media processing device;

in response to the indication, pair with the media processing device;

determine that the remote control device has been paired with the media processing device;

receive, in response to the pairing, a remote control profile to configure the remote control device;

configure the remote control device according to the remote control profile, wherein configuring the remote control device comprises configuring the remote control device with one or more commands to control the media processing device, and wherein configuring the remote control device according to the remote control profile further configures the remote control device with one or more additional commands to control one or more additional electronic devices.

15. The remote control device of claim 14, wherein the remote control device comprises a user equipment device.

16. The remote control device of claim 14, wherein receiving the remote control profile is performed via a wide area network (WAN) and wherein receiving the remote control profile and configuring the remote control device is performed without interaction with the media processing device.

17. The remote control device of claim 14, wherein receiving the remote control profile is performed via the media processing device.

18. The media processing device of claim 9, wherein the remote control profile is stored by a server accessible via a wide area network (WAN).

19. The remote control device of claim 14, wherein the remote control profile is stored by a server accessible via a wide area network (WAN).

20. The remote control device of claim 14, wherein the remote control profile comprises the one or more additional commands in response to detecting the one or more additional electronic devices.

* * * * *